United States Patent [19]
Wilson et al.

[11] Patent Number: 5,197,410
[45] Date of Patent: Mar. 30, 1993

[54] RELEASABLE TETHER

[76] Inventors: Comer J. Wilson; Wayne A. Wilson, both of 147 Verde Cir., Rohnert Park, Calif. 93928

[21] Appl. No.: 931,633

[22] Filed: Aug. 18, 1992

[51] Int. Cl.$^5$ ............................................... A01K 3/00
[52] U.S. Cl. ..................................... 119/114; 119/111
[58] Field of Search .................. 119/110, 111, 114, 96; 114/217

[56] References Cited

U.S. PATENT DOCUMENTS

| | | | |
|---|---|---|---|
| 701,268 | 5/1902 | Howard et al. | 119/114 |
| 2,821,169 | 1/1958 | Barhorst | 119/114 |
| 3,910,234 | 10/1975 | Henson | 119/114 X |
| 5,125,365 | 6/1992 | Bonilla | 119/114 X |

Primary Examiner—Gene Mancene
Assistant Examiner—Thomas Price
Attorney, Agent, or Firm—Townsend and Townsend

[57] ABSTRACT

A releasable tether has a release clip with a slide bolt operated by either a cable attached to a remote release trigger or a thumb slide directly attached to the slide bolt. The cable is attached to the slide bolt by a ball bearing swivel to afford unlimited rotation therebetween. A reinforcing cable extends between a frame rotatably attached to the release clip by a hollow connector bolt and an anchor member at the handle end of a strap so that any forces exerted on the strap are taken up by the reinforcing cable and not the release cable or other release elements associated therewith. Protective tubular guides at the tether end and handle end of the strap afford freedom of movement for the release cable.

21 Claims, 4 Drawing Sheets

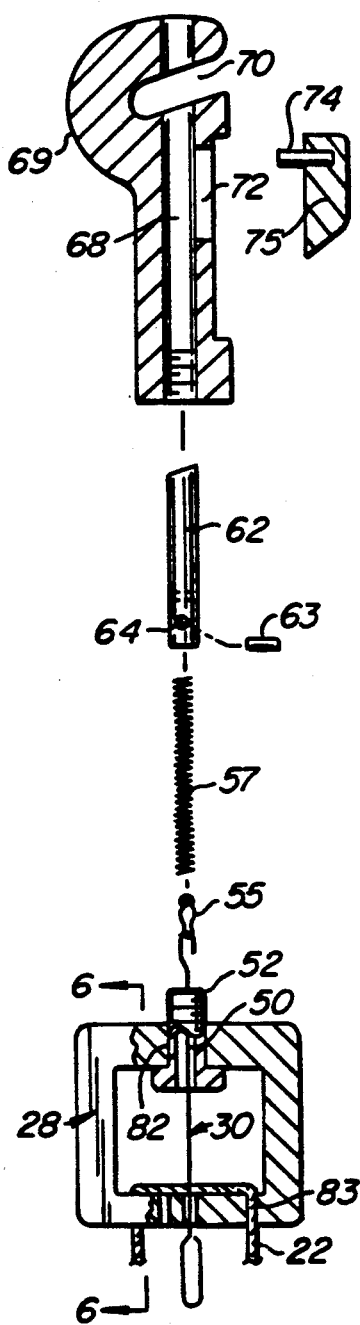
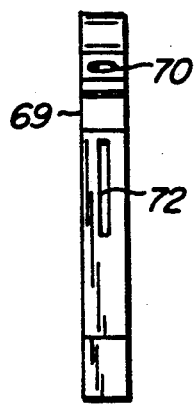
FIG. 4.
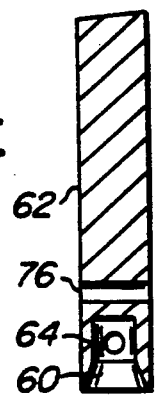
FIG. 5.
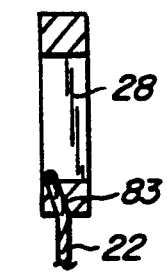
FIG. 6.
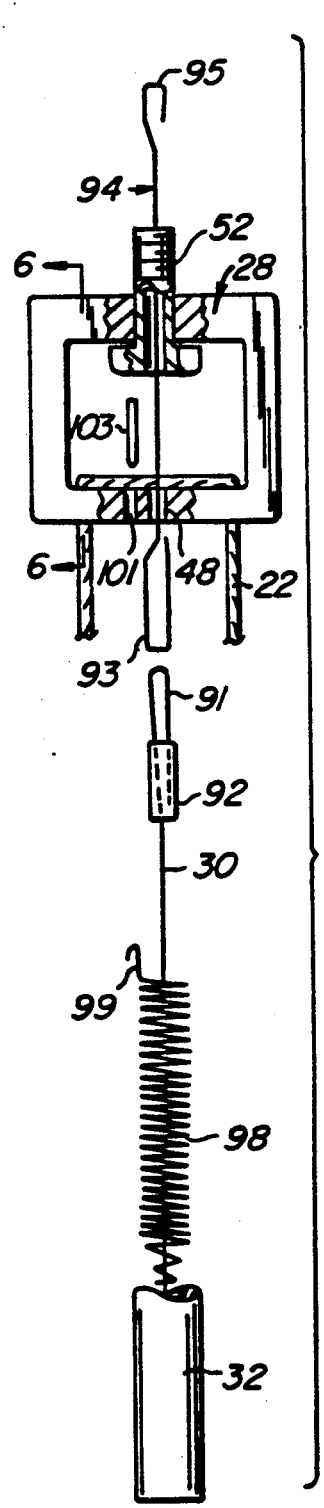
FIG. 7.

RELEASABLE TETHER

BACKGROUND OF THE INVENTION

This invention relates to releasable tethers used to provide quick detachment of a tether strap from an object, such as an animal collar, a halter ring or the like.

Releasable tethers are known which enable a user to remotely detach a tether from an object, such as a dog collar, a horse halter, or the like. Examples of such devices are described in the following U.S. Pat. Nos., the disclosures of which are hereby incorporated by reference: U.S. Pat. Nos. 296,764; 937,800; 2,652,809; 2,821,169; 3,910,234; 4,404,927; 4,742,605; 4,903,638; and 4,932,362. A typical releasable tether includes a strap having a handle portion and a tether end, a releasable clip located at the tether end and adapted to be clipped to a ring or other securing loop located on the object to be tethered, and a manually actuatable releasing mechanism having a working end located at the handle portion of the strap and some type of connector extending usually along the interior of the strap to a release mechanism incorporated into the clip. Usually, the release mechanism includes a slidable bolt which is biased to the closed position, and this biasing force can be overcome by operation of the manually actuatable releasing mechanism.

While many arrangements have been proposed, all known remotely actuatable tether mechanisms share several requirements. Aside from the need for mechanical simplicity, low manufacturing cost and reliability, releasable tethers must be able to withstand twisting movements, as well as often unpredictable and severe strains caused by sudden pulls, jerks and the like. These requirements are especially severe when the tether is used in connection with an animal such as a dog.

SUMMARY OF THE INVENTION

The invention comprises a releasable tether which is relatively simple in design, low in cost, easy to fabricate, attractive in appearance and capable of withstanding twisting and linear movements without impairing the easy operability of the release mechanism or allowing premature release. Further, the invention enables the tether to be released from either the handle end or the tether end with a minimum of effort.

In the broadest aspect, the invention includes a releasable tether comprising a strap having a handle end, a tether end and an intermediate portion extending therebetween, the intermediate portion having a longitudinally extending interior channel portion. A first cable is slidably located in the interior channel portion and has a first end terminating at the handle end of the strap and a second end terminating at the tether end of the strap. A substantially inextensible reinforcing means extends between the handle end and the tether end of the strap. The reinforcing means preferably comprises at least one additional cable extending between the handle end and the tether end of the strap. In the preferred embodiments, an anchor member is secured to the strap adjacent the handle end, and the reinforcing means is coupled to the anchor member at the handle end. A release clip is coupled to the reinforcing means adjacent the tether end of the strap, the release clip including a housing with a slotted opening, a longitudinally extending bore and a release bolt slidably received in the bore. Biasing means normally urges the bolt to a position blocking the opening in the release clip housing. A swivel member having a first portion coupled to the release bolt and a second portion coupled to the first end of the first cable, via an intermediate link permits the release clip to freely rotate with respect to the first cable to eliminate cable twisting. A manually actuatable releasing means is remotely located adjacent the handle end of the strap and is coupled to the second end of the first cable for enabling a user to retract the bolt to a release position by manipulating the cable along the internal channel portion. To facilitate sliding motion, the first cable is arranged along the interior channel portion of the strap. Depending on the nature of the strap material, this interior channel portion may be inherently provided (for example, by using tubular mesh material) or may be formed by any suitable process (as by gouging a central depression on the inner facing surface of a double layered leather strap). A tubular cable shield is optionally secured to the handle end of the strap, or the tether end of the strap, or both, in order to provide additional freedom of movement and protection for the first cable.

The release clip preferably includes a frame member having first and second apertures, and a hollow connecting bolt rotatably received in the first frame member aperture and secured to one end of the housing. The intermediate link coupled to the first end of the first cable passes through the first and second apertures in the frame and the hollow connecting bolt, and the swivel member located within the longitudinally extending bore of the release clip housing. The frame member has a pair of offset throughbores, and the additional cable comprising the reinforcing means is received within the offset throughbores so that the sliding function of the intermediate link is unimpeded by the reinforcing means.

In one embodiment employing a relatively inflexible strap material (e.g., leather), the anchor member comprises a protective hollow tube having a pair of flanking flange members secured to the handle end of the strap; the reinforcing means is coupled to the anchor member; and the releasing means includes a curved trigger having a tubular section slidably received within the protective hollow tube. In this embodiment, the reinforcing means is preferably coupled to the flange members, and the strap has a pair of facing layers, with the anchor member being positioned within the facing layers so as to be protected by the strap material. In this embodiment, the curved trigger is protected by a trigger guard coupled to the handle end of the strap.

In another embodiment using a relatively flexible tubular mesh strap material (e.g., nylon), the anchor member comprises a solid block having a central throughbore and a base portion with a cutout section, the reinforcing means being coupled to the anchor member; and the manually actuatable releasing means includes a tubular member slidably received within the central throughbore of the block. The manually actuatable releasing means further includes a pull ring which is manually engageable by the user and normally received within the cutout section of the base portion of the block. The anchor member further includes a protective hollow tube received within the central throughbore of the block within which the tubular member is slidably arranged. Additional bias means coupled between the anchor member and the tubular member of the releasing means normally biases the releasing means toward the tether end of the strap to assist in maintaining the release bolt in the blocking position and to add additional resisting force so that the force required to release the bolt is increased over that afforded by the biasing means at the release clip, which is limited in size by the clip dimensions.

The invention also preferably includes manually engageable means coupled to the release bolt and positioned at the clip housing for enabling a user to directly retract the release bolt without directly involving the remote manually actuatable means located at the handle end of the strap.

For a fuller understanding of the nature and advantages of the invention, reference should be had to the ensuing detailed description taken in conjunction with the accompanying drawings.

BRIEF DESCRIPTION OF THE DRAWINGS

FIG. 3 is a top plan view showing the anchor member, trigger and reinforcing cable of the FIG. 1 embodiment;

FIG. 4 is a side elevational view partially broken away of the FIG. 3 elements;

FIG. 5 is a sectional view taken along lines 5—5 of FIG. 4;

FIG. 6 is an exploded view partially in section showing the release clip and associated elements at the tether end of the invention of FIG. 1;

FIG. 7 is a front edge view of the release clip housing;

FIG. 13 is a fragmented plan view partially broken away illustrating the FIG. 11 embodiment; and FIG. 14 is a view of the handle end similar to FIG. 2 showing the releasing means removed from the anchor member and showing the additional biasing means.

DESCRIPTION OF THE PREFERRED EMBODIMENTS

Figure 1:
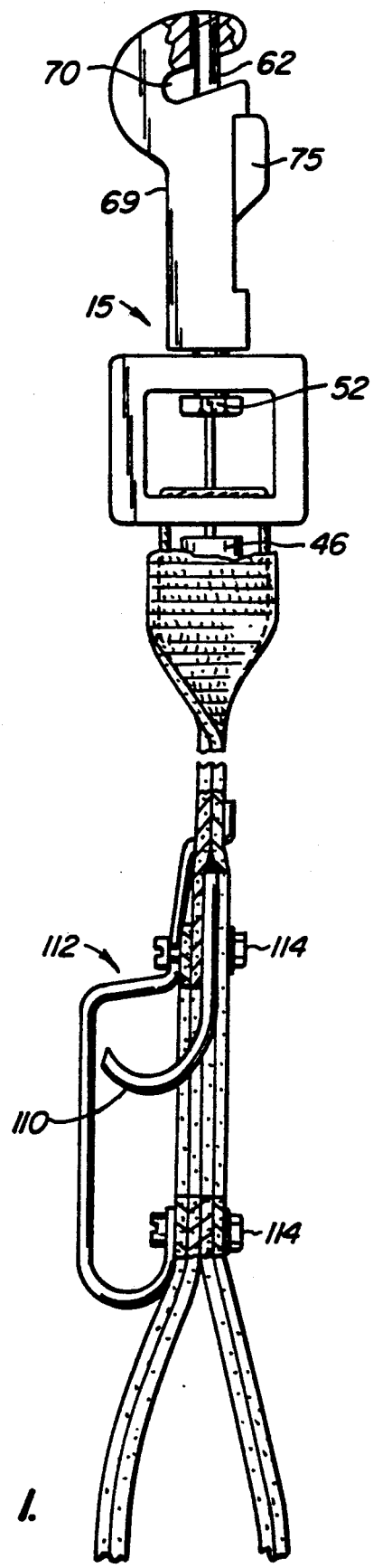
FIG. 1 is a plan view partially broken away illustrating a first embodiment of the invention.
Figure 9:
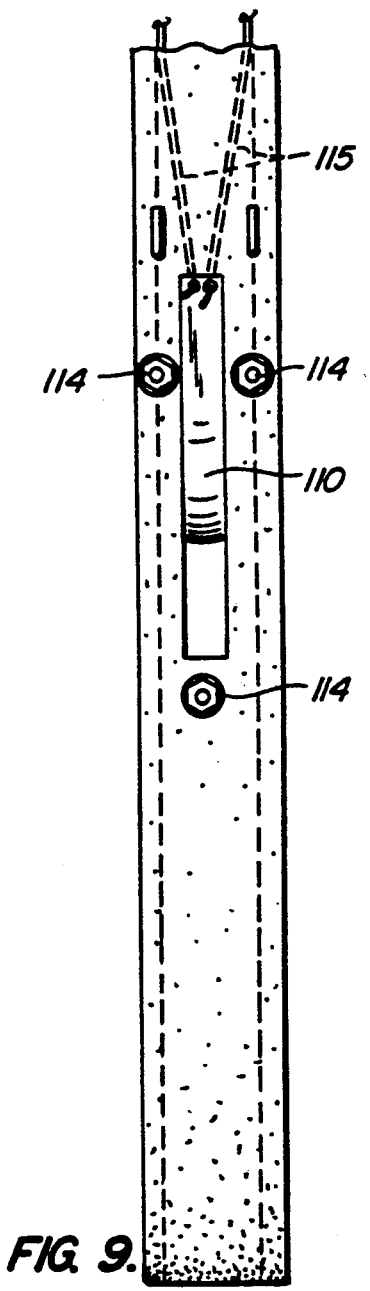
FIG. 9 is a sectional view of the release clip frame taken along lines 9—9 of FIG. 3.
Figure 2B:
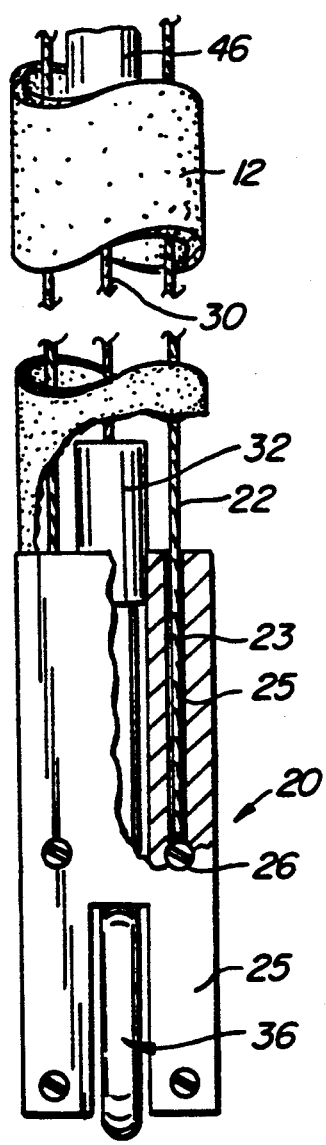
FIG. 2 is a top plan view of the handle end of the embodiment of FIG. 1.
Figure 2A:
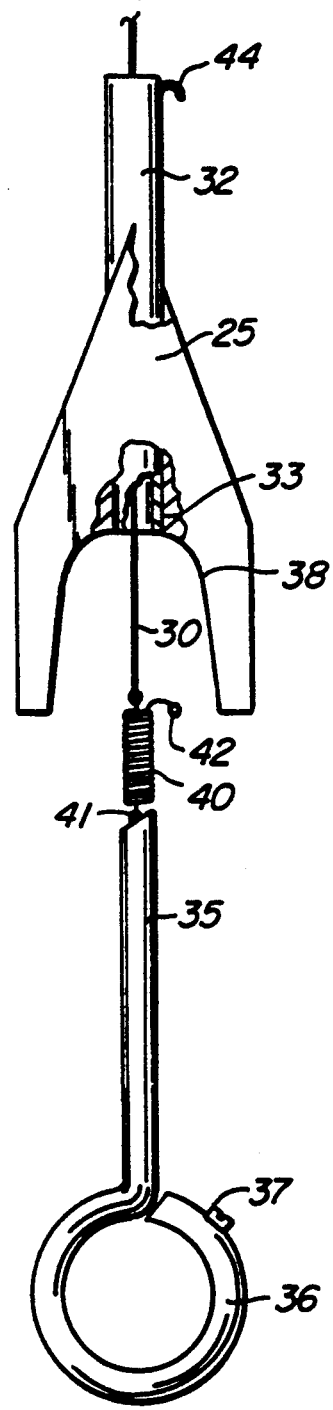
Figure 2:
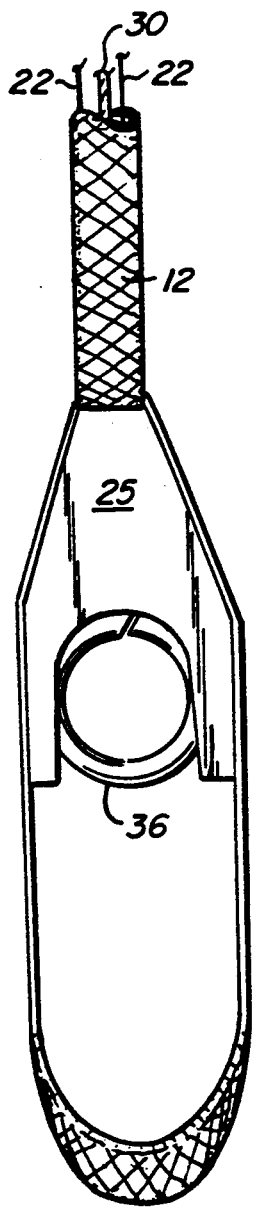
Figure 10:
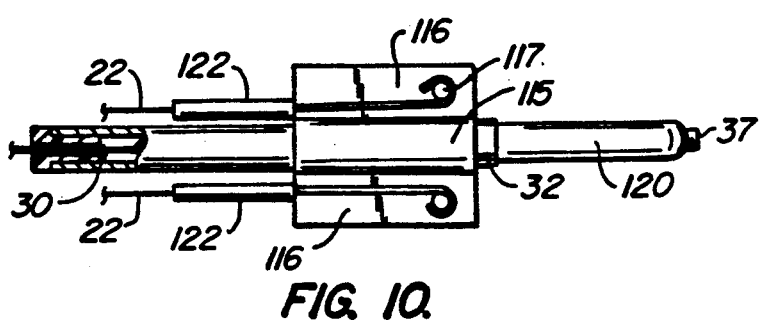
FIG. 10 is an exploded view showing additional elements at the tether end of the invention.

Turning now to the drawings, FIGS. 1-10 illustrate a first embodiment of the invention. As best seen in FIGS. 1 and 2, this embodiment includes a strap 12 fabricated from a double layer of relatively inflexible flat material such as leather. The leather is double stitched along the length and looped around as partially depicted in FIG. 1 to form a handle. Strap 12 has a longitudinally extending interior channel portion which is suggested by phantom lines 13 in FIGS. 1 and 2. This channel portion is formed in any suitable manner such as by removing leather material by gouging along the facing surfaces of two flat straps of leather. Other techniques will occur to those skilled in the art. Adjacent the upper tether end of strap 12 is a release clip generally designated with reference numeral 15. Adjacent the lower handle end of the strap 12 is a manually actuatable release mechanism generally designated with reference numeral 20. Extending from the handle end to the tether end of strap 12 is a reinforcing cable 22 having a first end anchored within the handle end in the manner described below. Cable 22 extends from the handle end along the interior of strap 12 inboard of stitching 24 to the tether end thereof, is attached to a generally rectangular frame member 66 in the manner described below and returns along the interior of strap 12 to the handle end where the other end of cable 22 is internally anchored as described below. Cable 22 is preferably nylon wrapped stainless steel leader line of the type available in sporting goods stores, preferably having a test range of 90 lbs. to 220 lbs.

An operating cable forming part of the releasing mechanism and designated with reference numeral 30 extends between the release clip 15 and the handle end of strap 12. As best seen in FIGS. 2-5, cable 30 is slidably received within a protective tube 32 which is received within an anchor member generally designated with reference numeral 35. Anchor member 35 comprises a central tubular portion 37 and a pair of flanking flange members 38, 39 each having an aperture 40 for receiving the central body portion of a fastener 42 (FIG. 1). Tube 32 is preferably formed from ¼ in. I.D. brass tubing. Cable 30 is secured directly to a trigger member generally designated with reference numeral 45. Trigger member 45 has a central shaft 46 terminating in an arcuate portion 47 dimensioned to accommodate the finger of a user. Shaft 46 and arcuate portion 47 are preferably formed from ¼ in. O.D. tubular steel. Cable 30 may be secured to the trigger member 45 in any suitable fashion, depending on the structure of elements 35, 36. In the preferred version of the first embodiment, elements 46 and 47 are hollow and the cable 30 is threaded through the section 46 around the portion 47 and held in place by a set screw 48. Other suitable arrangements will occur to those skilled in the art. Cable 30 is preferably 90 lb. test stainless steel leader line.

Protective tube 32 serves as a cylindrical guide for the straight shaft portion 46 of the trigger member, which slides within the tube 32. A small hollow plug 50 (FIG. 3) is fitted into the forward end of tube 32 and serves as an abutment stop for the free end of straight trigger shaft portion 46. The reinforcing cable 22 is looped at each end around one of the fasteners 42 inserted through the flange apertures 40 and the loop is closed by means of brass connectors 52. Alternatively, if desired, the looped ends of reinforcing cable 22 can be passed around the flanges 38, 39.

With reference to FIGS. 1 and 6-10, the tether end of strap 12 terminates at a second protective tube 56 similar to tube 32. Release cable 30 passes through tube 56, and is looped at the tether end. The loop 57 is secured by means of a small brass connector 58 crimped over the cable 30. The loop 57 is engaged by the lower hook end 59 of a wire interconnecting link 60. Link 60 has an upper hook end 61, which is attached to the lower end of a low friction swivel 63 (FIG. 6). The main body portion of link 60 passes through a lower aperture 65 in a frame member generally designated with reference numeral 66, and through the hollow interior 67 of a hollow connecting bolt 68. Link 60 is preferably formed from 0.032 in. diameter spring steel wire.

An additional spring 69 is received within the upper end of tube 56, and spring 69 has a bottom portion 70 of smaller diameter than the outer diameter of the brass connector 58. An upper end 71 of spring 69 is received within an aperture 72 formed in the lower horizontal portion of frame member 66 and is secured in place by means of a fastening pin 73. Swivel 63 is preferably a ball bearing swivel of the type used in fishing equipment and is preferably a #21B Sampo swivel. The upper end of swivel 63 is positioned within a flared blind recess 75 (FIG. 8) formed within the bottom portion of a slide bolt 76. Swivel 63 is connected to slide bolt 76 by means of a swivel attaching pin 77 which is received within a crossbore 78 formed within bolt 76. Slide bolt 76 is preferably fabricated from polished spring steel and has an upper surface formed at a 20° angle with respect to the bottom surface. Slide bolt 76 is received within a longitudinally extending bore 79 formed in a release clip housing 80 having an angled slot 81. As best seen in FIG. 7, housing 80 has a longitudinally extending slot 82 cut through the outer wall into the interior bore 79 so as to slidingly accommodate the pin portion 84 of a thumb slide member 85. Pin 84 is dimensioned to be frictionally received within a second crossbore 86 (FIG. 8) formed in slide bolt 76 so that downward pressure on thumb slide member 85 causes the bolt 76 to retract from a position completing blocking the slot 81.

In the assembled state, the bolt 76 is received within the central and upper portion of bore 79 in release clip housing 80 with the pin 84 of thumb slide member 85 received in the cross bore 86. The upper end of swivel 63 is pinned within the flared blind bore 75 of slide bolt 76 by means of pin 77 received within crossbore 78. Surrounding the swivel 63 and the upper end 61 of link 60 is a spring 87 received in the lower portion of longitudinal bore 79 above the end of bolt 68. Spring 87 is held in place by hollow bolt 68 which is threadably engaged within the lower end of throughbore 79. Bolt 68 passes through an upper aperture 88 formed in the upper horizontal portion of frame member 66. The bolt 68 is designed to bottom out in the threaded portion of longitudinal bore 79 in a position in which the housing 80 is not clamped to the frame member 66 so that elements 80 and 66 are free to rotate with respect to one another about the axis of the bolt 68. In an actual embodiment, bolt 79 is a ¼-20 bolt with a threaded portion having a length of ⅜ in. and a total shaft length of ⅝ in.; and the threaded lower portion of longitudinal bore 79 is ⅜ in. In addition, and most importantly, the cable 30 and slide bolt 76 are freely mutually rotatable due to the low friction swivel 63. Thus, no amount of rotation of the housing 80 with respect to the cable 30 will cause any twisting of the cable.

The tether end of the reinforcing cable 22 passes through a laterally spaced pair of angled bores 90 (FIGS. 6 and 9) so that the bight along the upper surface of the lower horizontal portion of frame 66 does not interfere with the longitudinal motion of the cable 30. Thus, the reinforcing cable 22 is arranged to take the total force exerted by any sharp pulls or jerks on the strap without interfering with the smooth operation of the retracting cable 30.

In use, when the cable 30 is manually retracted by manipulation of the trigger 45, the loop 57 pulls down on the link 60, which in turn pulls down on the swivel 63 to retract the slide bolt 76. During downward motion, spring 87 is compressed within bore 79 and the connector 58 bottoms out in spring 69. Any further downward movement of the cable causes downward movement of the lower end of spring 69 and consequent stretching of the spring 69. When the trigger 45 is released, the springs 69 and 87 return the cable 30 and the slide bolt 76 to the upper resting position.

Use of the device is very simple. The tether end may be attached to any desired looped object, such as a connecting ring on an animal collar, by retracting slide bolt 76 until slot 81 is sufficiently clear to receive the retaining loop on the object. This retraction of the slide bolt 76 is most easily accomplished by manipulating the thumb slide 85 downwardly as depicted in the Figs. However, if desired the trigger 45 can also be used at the same time, although this is not necessary. Due to the internal space afforded by tubes 32 and 56 and the free play between link 60 and cable loop 57, when the slide bolt 76 is manually retracted by the thumb slide 85, the resistance felt is essentially that provided by bias spring 87, since the loop 59 of link 60 can slide within loop 57. During this process, tube 56 affords unhampered movement for loop 59. Depending on the amount of "feel" afforded by the compression spring 87, the manual release action felt by the user via thumb slide 85 can range anywhere from very light to very strong.

After the object has been tethered by releasing the thumb slide 85, the device can be used as a conventional tether until such time as release of the object is desired. At this point, release can be effected either by manipulating the thumb slide 85 or the trigger 45. In most cases of emergency, such as when the device is used to tether a guard dog, remote release is readily accomplished simply by pulling on the trigger 45 until the slide bolt 76 is retracted a sufficient distance to enable the release of the collar loop from the angled opening 81. Upon release of pressure on the trigger 45, the slide bolt 76 is automatically returned to the closed position illustrated in FIG. 1 by means of the action of the compressed spring 87 location in bore 79 and spring 69 located at the tether end (i.e., within the tube 56).

Figure 11:
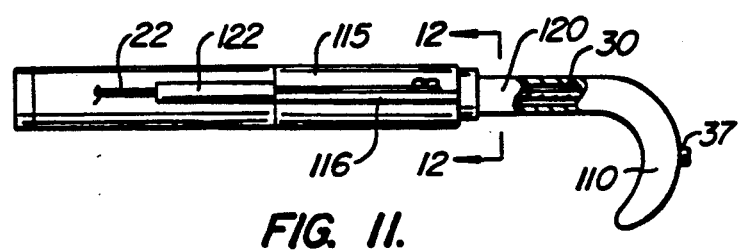
FIG. 11 is a side view of the handle end of an alternate embodiment of the invention.
Figure 12:
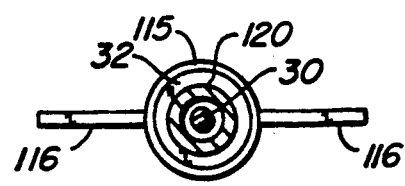
FIG. 12 is a detail view partially broken away showing the handle reinforcement element.
Figure 8:
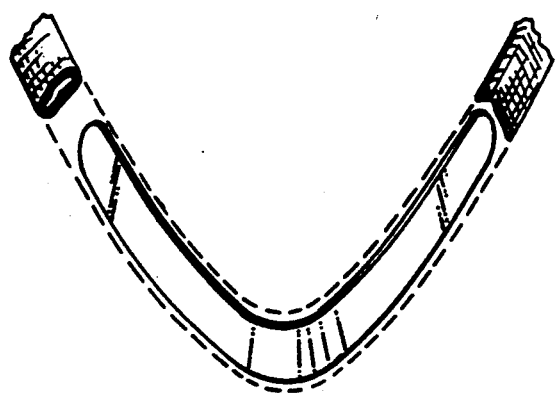
FIG. 8 is a sectional view of the release bolt.

FIGS. 11-14 illustrate an alternate embodiment of the invention having a different strap and handle structure. As seen in these Figs., cables 22 and 30 are enclosed in a hollow, mesh sheath 100 made of tubular nylon or any other suitable, durable material. Sheath 100 is looped at the handle end (FIG. 11), and the trigger structure is replaced with an anchor block 105 and a looped pull ring member 110. As best seen in FIG. 12, a boomerang-shaped insert 101 is installed within the looped end of sheath 100 so that the handle loop stays open as shown in FIG. 11 when the looped end is attached to the anchor block 105. Insert 101 can be fabricated from any suitable material, such as flat resilient plastic.

Anchor block 105 is provided with a base portion having a relieved or cutout section 106 sized to accommodate the arcuate loop 110 in the manner shown in FIG. 11. Reinforcing cable 22 is anchored within bores 107 formed in anchor block, the ends being anchored by any suitable fasteners such as screws 108. Central shaft 111 is slidably received within protective tube 32, which is received within a throughbore 109 formed centrally of anchor block 105. Cable 30 is secured directly to pull ring member 110 having a central shaft 111 terminating in an arcuate loop 112 dimensioned to receive the finger of the user. Shaft 111 and arcuate loop 112 are preferably formed from ¼ in. O.D. tubular steel. Cable 30 is secured to pull ring member 110 in any suitable fashion, depending on the structure of elements 111, 112. In the embodiment of FIGS. 11-14, elements 111, 112 are hollow and the cable 30 is threaded downwardly through element 111, around the loop 112 and held in place by a set screw 113. A small bias spring 115 is secured at a first end 116 to the upper end of central shaft 111. The other end 117 of spring 115 is secured to the upper portion of tube 32 by means of a small lug 118 or the equivalent in order to provide a biasing force tending to pull the arcuate loop 112 upwardly as viewed in the Figures to a normal position in which the release clip is closed. Use of the embodiment of FIGS. 11-14 is essentially the same as that described above with reference to the embodiment of FIGS. 1-10.

As will now be apparent, the invention provides a simple releasable tether which is relatively inexpensive and uncomplicated to fabricate, is easy to use and highly reliable in operation. The extremely low friction afforded by the swivel 63 between the release cable 30 and the slide bolt 76 permits virtually unlimited twisting of the release clip housing 80 with respect to cable 30. Also, the use of the reinforcing cable 22 provides substantial resistance to tearing, twisting or stretching of the strap 12 and takes up the major strain in use. The use of the retracting cable tubular elements 32, 56 affords freedom of movement for the release cable and permits slack motion of the cable when the slide bolt 76 is manually retracted by means of thumb slide 85. Also, the trigger version of the invention best illustrated in FIG. 1 provides an aesthetically pleasing look and feel in the field.

The sliding motion of the retracting cable 30 is greatly assisted in the embodiment of FIGS. 1-10 by virtue of the interior relieved channel along the length of the leather strap. In a working example of this embodiment, this interior channel was afforded by simply gouging out a portion of the rough side of the leather strap material prior to sewing both pieces together. Also, if desired, a lubricant may be applied to the interior channel to reduce sliding friction between cable 30 and the channel.

Although cable 22 is substantially inextensible as designed, there may be some stretching over time in response to long term use or momentarily in response to an extreme pulling force. To avoid inadvertent release of the animal, the relative length dimensions of the slide bolt 76 and the upper end of bore 79 (above the slot 81) are chosen such that the top of slide bolt 76 will not clear the slot 81 in response to slight relative motion between cable 30 and the cable 22 (or the strap). In addition, the release clip is assembled in such a manner that the slide bolt 76 closes the upper end of bore 79 to prevent the ingress of contaminants into bore 79, which could affect the smooth sliding operation of the device.

While the above provides a full and complete disclosure of the preferred embodiments of the invention, various modifications, alternate constructions and equivalents may occur to those skilled in the art. For example, although cables having certain dimensions and other elements having certain material construction have been identified, other materials and dimensions may be suitable, depending on the nature of the application of the invention. Also, cable 30 may be provided with a low friction shield along the major portion of the cable length between the handle end and the tether end, if desired. Further, to add additional strength, additional cables 22 may be added. Therefore, the above descriptions should not be construed as limiting the scope of the invention, which is defined by the appended claims.

What is claimed is:

1. A releasable tether comprising:
   a strap having a handle end, a tether end, and an intermediate portion extending therebetween, said intermediate portion having a longitudinally extending interior channel portion;
   a first cable slidably located in said interior channel portion of said strap and having a first end and a second end;
   substantially inextensible reinforcing means extending between said handle end and said tether end of said strap;
   a release clip coupled to said reinforcing means adjacent the tether end of said strap, said release clip having a housing with an opening, a longitudinally extending bore and a release bolt slidably received in said bore for controlling access to said opening;
   means for normally biasing said bolt to a position blocking said opening;
   a swivel member having a first portion coupled to said bolt and a second portion coupled to said first end of said first cable so as to permit said release clip to freely rotate with respect to said first cable; and
   manually actuatable releasing means located adjacent said handle end of said strap and coupled to said second end of said first cable for enabling a user to retract said bolt to a release position by sliding said cable along said interior channel portion.

2. The invention of claim 1 wherein said reinforcing means comprises at least one additional cable extending between said handle end and said tether end of said strap.

3. The invention of claim 2 further including an anchor member secured to said strap adjacent the handle end; and wherein said additional cable is coupled between said anchor member and said release clip.

4. The invention of claim 3 wherein said release clip further includes a frame member, and wherein said additional cable is coupled to said frame member.

5. The invention of claim 4 wherein said frame member has a pair of offset throughbores; and wherein said additional cable is received in said offset throughbores.

6. The invention of claim 1 wherein said release clip further includes a frame member having an aperture, and a hollow connecting bolt rotatably received in said aperture and coupled to one end of said housing, said swivel member being located within said longitudinally extending bore of said release clip housing.

7. The invention of claim 1 further including a link member coupled between said swivel member and said first cable.

8. The invention of claim 1 wherein said releasing means includes a curved trigger; and wherein said tether further includes a trigger guard coupled to the handle end of said strap.

9. The invention of claim 8 further including a tubular member secured to the handle end of said strap, said curved trigger having a tubular body section slidably received within said tubular member.

10. The invention of claim 1 wherein said releasing means includes a pull ring sized to accommodate the finger of a user.

11. The invention of claim 1 further including a tubular cable shield secured to the handle end of said strap for providing a protective enclosure for said first cable.

12. The invention of claim 1 further including a tubular cable shield secured to the other end of said strap for providing a protective enclosure for said first cable.

13. The invention of claim 1 further including an anchor member having a protective hollow tube with a pair of flanking flange portions secured to the handle end of said strap; wherein said reinforcing means is coupled between said anchor member and said release clip; and wherein said releasing means includes a curved trigger having a tubular section slidably received within said protective hollow tube.

14. The invention of claim 13 wherein said reinforcing means is coupled to said flange members.

15. The invention of claim 13 wherein said strap has a pair of facing layers; and wherein said anchor member is positioned within said facing layers.

16. The invention of claim 13 further including a trigger guard coupled to the handle end of said strap.

17. The invention of claim 1 further including an anchor member comprising a solid block having a central throughbore and a base portion with a cutout section; wherein said reinforcing means is coupled between said anchor member and said release clip; and wherein said releasing means includes a tubular member slidably received within said central throughbore of said block.

18. The invention of claim 17 wherein said releasing means further includes a curved end portion normally received within said cutout section of said base portion of said block.

19. The invention of claim 18 wherein said anchor member further includes a protective hollow tube received within said central throughbore of said block.

20. The invention of claim 17 further including additional bias means coupled between said anchor member and said releasing means for normally biasing said releasing means towards said tether end of said strap.

21. The invention of claim 1 further including manually engageable means coupled to said release bolt and positioned at said clip housing for enabling a user to directly retract said release bolt without direct engagement with said releasing means.

* * * * *